(12) United States Patent
Han

(10) Patent No.: US 10,263,489 B2
(45) Date of Patent: Apr. 16, 2019

(54) MOTOR HOUSING AND MOTOR INCLUDING SAME

(71) Applicant: LG Innotek Co., Ltd., Seoul (KR)

(72) Inventor: Cheong Un Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 90 days.

(21) Appl. No.: 15/545,216

(22) PCT Filed: Dec. 22, 2015

(86) PCT No.: PCT/KR2015/014079
§ 371 (c)(1),
(2) Date: Jul. 20, 2017

(87) PCT Pub. No.: WO2016/117838
PCT Pub. Date: Jul. 28, 2016

(65) Prior Publication Data
US 2017/0373556 A1     Dec. 28, 2017

(30) Foreign Application Priority Data

Jan. 20, 2015   (KR) .................. 10-2015-0009434

(51) Int. Cl.
*H02K 5/16* (2006.01)
*H02K 7/08* (2006.01)
(Continued)

(52) U.S. Cl.
CPC .............. *H02K 5/163* (2013.01); *H02K 5/10* (2013.01); *H02K 5/173* (2013.01); *H02K 7/08* (2013.01)

(58) Field of Classification Search
CPC .......... H02K 5/163; H02K 5/173; H02K 5/10; H02K 5/16
(Continued)

(56) References Cited

U.S. PATENT DOCUMENTS 3,833,276 A   9/1974  Baumann et al.
5,880,545 A   3/1999  Takemura et al.
(Continued)

FOREIGN PATENT DOCUMENTS

CN   201075762 Y   6/2008
CN   202798276 U   3/2013
(Continued)

OTHER PUBLICATIONS

Supplementary European Search Report dated Aug. 21, 2018 in European Application No. 15879092.3.
(Continued)

*Primary Examiner* — Naishadh N Desai
(74) *Attorney, Agent, or Firm* — Saliwanchik, Lloyd & Eisenschenk

(57) ABSTRACT

The present invention provides a housing of a motor including a bearing pocket portion which is formed to protrude from an inner lower portion of the housing and in which an accommodation space of a bearing configured to support a shaft is formed and a shaft hole through which the shaft passes is formed in a bottom surface thereof, wherein the bearing pocket portion includes a stepped portion, the stepped portion protrudes upward along a circumference of the shaft hole, and an accommodation groove is formed between the stepped portion and an inner wall of the bearing pocket portion, thereby providing an advantageous effect of preventing foreign materials discharged from the housing of the motor, the wave washer, the bearing, and the like from exiting through the shaft hole.

14 Claims, 9 Drawing Sheets

(51) Int. Cl.
*H02K 5/10* (2006.01)
*H02K 5/173* (2006.01)

(58) Field of Classification Search
USPC ..... 310/89, 90, 91, 90.5, 400–410, 418–425
See application file for complete search history.

(56) References Cited

U.S. PATENT DOCUMENTS

| | | | |
|---|---|---|---|
| 7,635,935 B2* | 12/2009 | Sonohara | F16C 17/08 |
| | | | 310/40 MM |
| 9,979,257 B2* | 5/2018 | Wittstadt | H02K 5/10 |
| 2002/0101124 A1* | 8/2002 | Horng | H02K 7/085 |
| | | | 310/91 |
| 2009/0072602 A1 | 3/2009 | Schuler | |
| 2010/0176673 A1 | 7/2010 | Wright et al. | |

FOREIGN PATENT DOCUMENTS

| | | |
|---|---|---|
| EP | 1 729 396 A1 | 12/2006 |
| JP | 5-332366 A | 12/1993 |
| JP | 2012-16220 A | 1/2012 |
| KR | 10-1344280 B1 | 12/2013 |

OTHER PUBLICATIONS

International Search Report in International Application No. PCT/KR2015/014079 dated Dec. 22, 2015.

* cited by examiner

MOTOR HOUSING AND MOTOR INCLUDING SAME

CROSS-REFERENCE TO RELATED APPLICATIONS

This application is the U.S. national stage application of International Patent Application No. PCT/KR2015/014079, filed Dec. 22, 2015, which claims priority to Korean Application No. 10-2015-0009434, filed Jan. 20, 2015, the disclosures of each of which are incorporated herein by reference in their entirety.

TECHNICAL FIELD

The present invention relates to a motor housing and a motor including the same, and more particularly, to a motor housing including a bearing pocket portion configured to accommodate a bearing and a motor including the same.

BACKGROUND ART

Motors are apparatuses which convert electrical energy into rotational energy using a force received by a conductor in a magnetic field. Recently, as a use of the motor expands, a role of the motor becomes important. Particularly, as the number of electrical devices in vehicles rapidly increases, demand for the motor applied to a steering system, a braking system, a safety critical system, and the like is greatly increasing.

Particularly, a case in which an external force is applied to a motor in a direction of a shaft is increasing. Accordingly, motors combined with a bearing configured to support a load in a direction of a shaft, such as an angular bearing, and a wave washer have been suggested.

However, when vibrations are continuously applied to a motor and the motor is repeatedly driven, abraded materials may be discharged from a motor housing, a wave washer, a bearing, and the like. In the case in which such abraded materials exit the motor to the outside, the abraded materials may fatally affect the performance of a driving apparatus, a measurement apparatus, or other application apparatuses, such as a gear or sensor, adjacent to the motor. Particularly, in the case in which the abraded materials come into contact with the sensor, there may be a problem in that driving of the motor is delayed or the motor is not driven.

DISCLOSURE

Technical Problem

The present invention is directed to a motor housing capable of preventing foreign materials discharged from the motor housing, a wave washer, a bearing, and the like from exiting the motor to the outside and a motor including the same Particularly, the present invention is also directed to a motor housing including a bearing and a wave washer installed therein to prevent foreign materials from exiting a bearing pocket portion, in which many foreign materials are generated, to the outside through a shaft hole, and a motor including the same.

The scope of the present invention is not limited to the above-described objects, and other unmentioned objects may be clearly understood by those skilled in the art from the following descriptions

Technical Solution

One aspect of the present invention provides a housing of a motor including a bearing pocket portion which is formed to protrude from an inner lower portion of the housing and in which an accommodation space of a bearing configured to support a shaft is formed and a shaft hole through which the shaft passes is formed in a bottom surface thereof, wherein the bearing pocket portion includes a stepped portion, the stepped portion protrudes upward along a circumference of the shaft hole, and an accommodation groove is formed between the stepped portion and an inner wall of the bearing pocket portion.

The bottom surface of the bearing pocket portion forming the accommodation groove may be formed with at least two stepped surfaces in a radial direction.

An innermost stepped surface closest to the shaft hole, among the stepped surfaces, may be formed in a flat shape to be in contact with a wave washer.

The stepped surfaces may be formed in annular shapes and gradually lowered in the radial direction.

Grooves may be concavely formed in the stepped portion in a circumferential direction to be spaced a predetermined distance from each other such that a depth of each of the grooves is equal to a height of the stepped surface.

The innermost stepped surface may have a saw tooth shape.

Another aspect of the present invention provides a motor including a housing, a stator coupled to the housing, a rotor disposed inside the stator, a shaft coupled to the rotor, and a bearing pocket portion which is formed to protrude from an inner lower portion of the housing and in which an accommodation space of a bearing configured to support the shaft is formed and a shaft hole through which the shaft passes is formed in a bottom surface thereof, wherein the bearing pocket portion includes a stepped portion, the stepped portion protrudes upward along a circumference of the shaft hole, and an accommodation groove is formed between the stepped portion and an inner wall of the bearing pocket portion.

The bottom surface of the bearing pocket portion forming the accommodation groove may be formed with at least two stepped surfaces in a radial direction.

An innermost stepped surface closest to the shaft hole, among the stepped surfaces, may be formed in a flat shape to be in contact with a wave washer.

The stepped surfaces may be formed in annular shapes and gradually lowered in the radial direction.

Grooves may be concavely formed in an upper surface of the stepped portion in a circumferential direction to be spaced a predetermined distance from each other such that a depth of each of the grooves is equal to a height of the innermost stepped surface.

The stepped portion may have a saw tooth shape.

The motor may further includes a bearing inserted into the bearing pocket portion and a sealing member disposed between an inner wall of the bearing pocket portion and the bearing.

The bearing may include a sealing groove which is concavely formed in a circumference of a side of an outer race and into which the sealing member is inserted.

Advantageous Effects

According to one embodiment of the present invention, since a stepped portion which defines an accommodation groove around a shaft hole of a bearing pocket portion is provided, there is an advantageous effect in that foreign materials discharged from a motor housing, a wave washer, a bearing, and the like can be prevented from exiting the outside through a shaft hole.

In addition, according to one embodiment of the present invention, since a bottom surface of a bearing pocket portion is formed to have a double step structure in a radial direction, there are advantageous effects in that a seating space of a wave washer is secured and an accommodation groove is also formed.

In addition, according to one embodiment of the present invention, since a stepped portion is formed in a saw tooth shape to trap foreign materials in grooves between saw teeth, there is an advantageous effect in that foreign materials are effectively prevented from exiting through a shaft hole.

MODES OF THE INVENTION

Hereinafter, exemplary embodiments of the present invention will be described in detail with reference to the accompanying drawings. Purposes, specific advantages, and novel features of the present invention will be made clear from the exemplary embodiments and the following detailed description in connection with the accompanying drawings. Terms and words used in this specification and claims thereof are not to be interpreted as limited to commonly used meanings or meanings in dictionaries, and should be interpreted as having meanings and concepts which are consistent with the technological scope of the present invention based on the principle that the inventors have appropriately defined concepts of terms in order to describe the present invention in the best way. In the description of the present invention, when it is determined that detailed descriptions of related well-known functions unnecessarily obscure the gist of the present invention, the detailed descriptions will be omitted.

Figure 1:
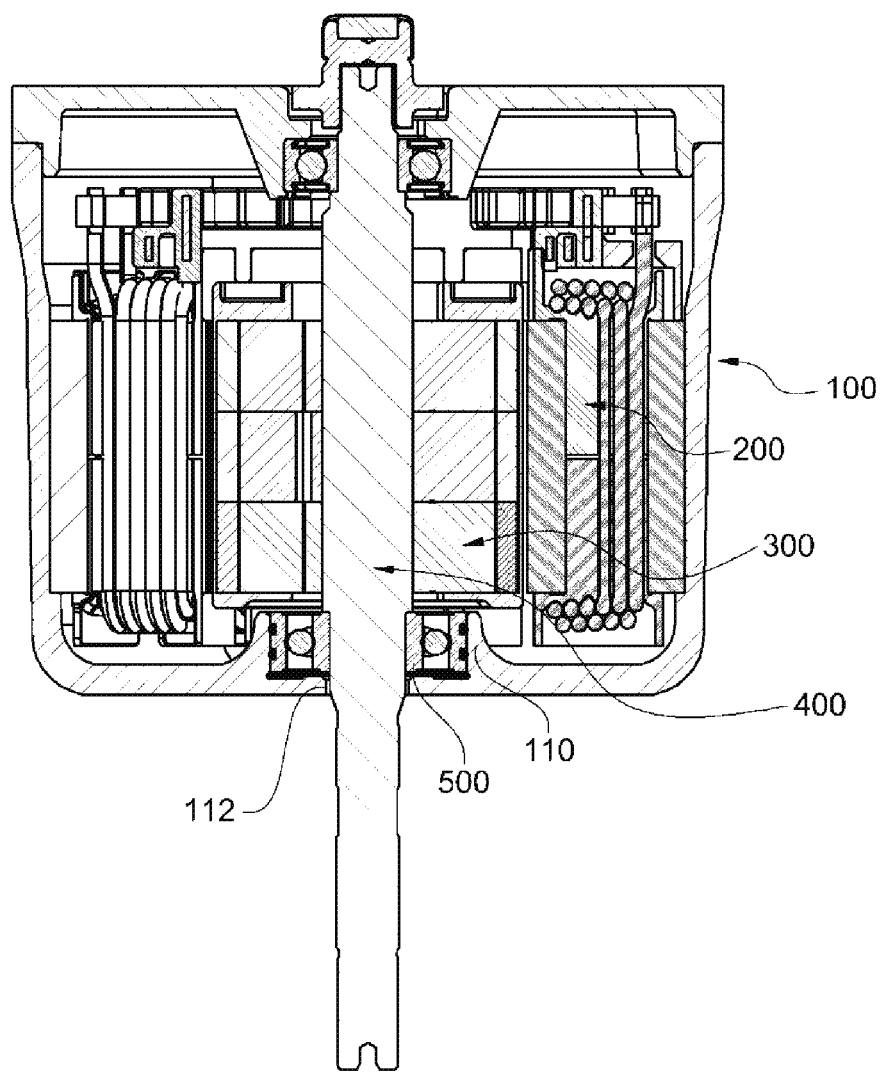
FIG. 1 is a view illustrating a motor according to an exemplary embodiment of the present invention.

FIG. 1 is a view illustrating a motor according to an exemplary embodiment of the present invention.

Referring to FIG. 1, the motor according to the embodiment of the present invention may include a housing 100, a stator 200, a rotor 300, and a shaft 400.

The housing 100 is formed in a cylindrical shape and provided with a space in which the stator 200 and the rotor 300 may be installed. Here, a shape and a material of the housing 100 may be variously changed, and a metal material capable of withstanding a high temperature may be selected for the housing 100 because the housing is installed in a vehicle. In addition, the housing 100 may be formed to shield the stator 200 and the rotor 300 from the outside.

A bearing pocket portion 110 may be formed to protrude from a central portion of an inner bottom surface of the housing 100. The bearing pocket portion 110 may be formed by being surrounded by an annular inner wall 110a so as to define an accommodation space of the bearing 500 therein. Here, an upper portion of the bearing pocket portion 110 may open, and a shaft hole 112 through which the shaft 400 passes is formed in a bottom surface 111 of the bearing pocket portion 110.

Foreign materials may exit the motor to the outside through the shaft hole 112. Meanwhile, a wave washer may be installed between the bearing 500 and the bottom surface 111.

The stator 200 may be disposed to be spaced a predetermined distance from the inner circumferential surface of the housing 100, and a space may be formed at a center of the stator 200.

The rotor 300 may be rotatably installed in a state in which the rotor 300 is accommodated in the space of the stator 200. The stator 200 may be formed with a plurality of stator cores, and a coil configured to generate a rotational magnetic field may be wound around each of the stator cores. The coil wound around the stator core may be covered and insulated by an insulator. However, the present invention is not limited thereto, and the stator may be formed as a single core type.

When a current is supplied to the coil wound around the stator 200, an electrical interaction with the rotor 300 occurs to induce rotation of the rotor 300. When the rotor 300 rotates, the shaft 400 is rotated to supply power.

A Housing of a Motor According to a First Embodiment

Figure 2:
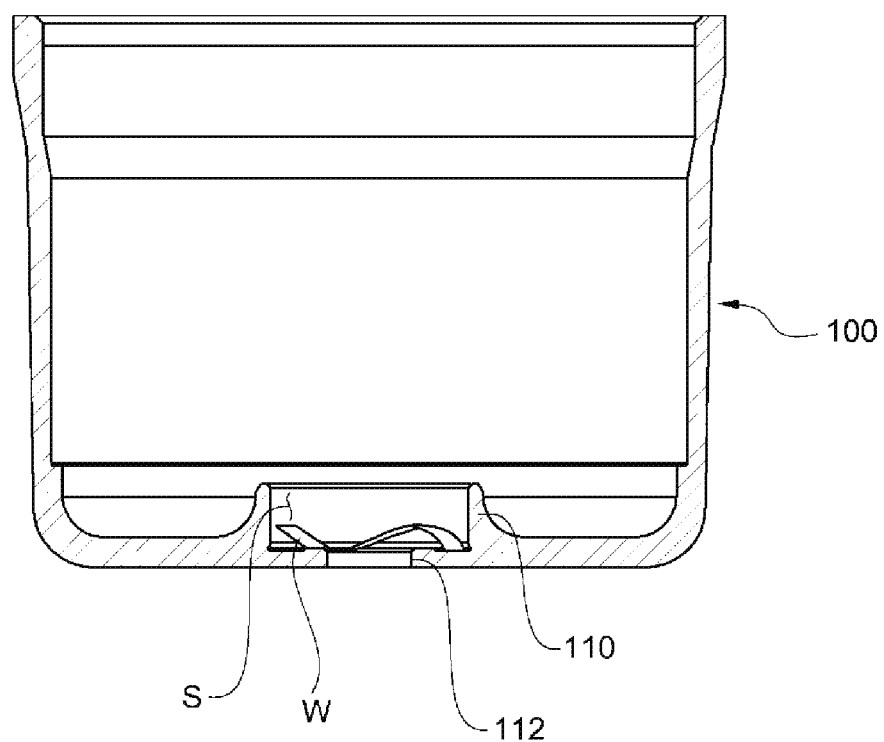
FIG. 2 is a view illustrating a housing of a motor according to a first exemplary embodiment of the present invention.
Figure 3:
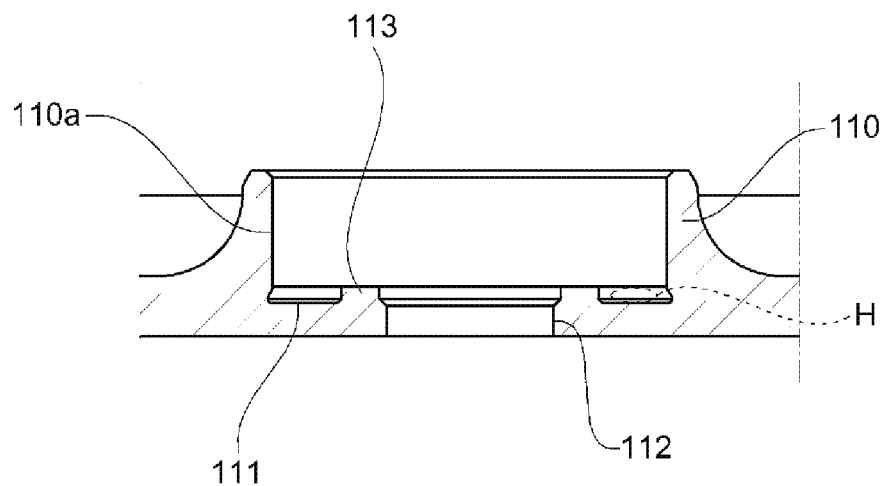
FIG. 3 is a view illustrating a bearing pocket portion of the housing illustrated in FIG. 2.
Figure 4:
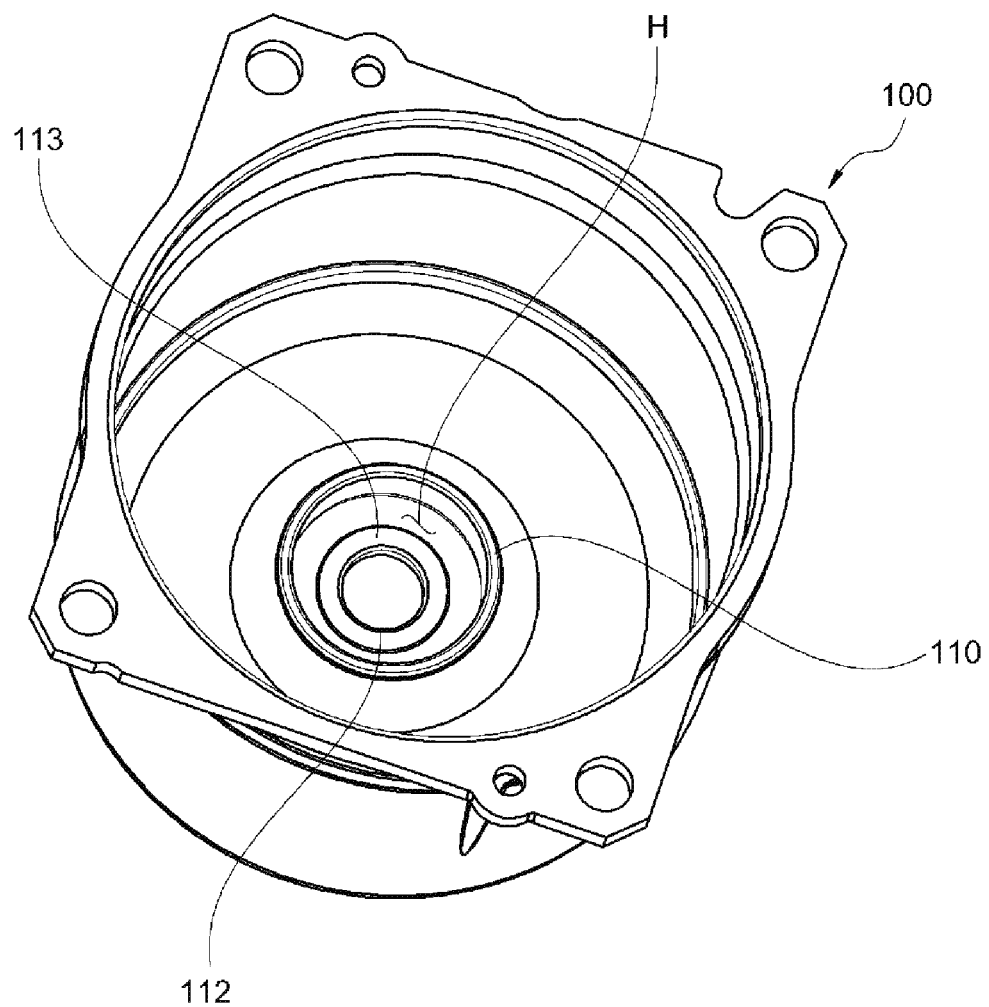
FIG. 4 is a view illustrating an accommodation groove of the housing illustrated in FIG. 2.

FIG. 2 is a view illustrating a housing of a motor according to a first exemplary embodiment of the present invention, FIG. 3 is a view illustrating a bearing pocket portion of the housing illustrated in FIG. 2, and FIG. 4 is a view illustrating an accommodation groove of the housing illustrated in FIG. 2. FIGS. 2 to 4 are the views clearly illustrating main features for a clear conceptual understanding of the present invention, and thus various modifications are expected and the scope of the present invention is not limited to specific shapes illustrated in the drawings.

Referring to FIGS. 2 to 4, a bearing pocket portion 110 including an accommodation space S for a bearing is formed in a lower portion of a housing 100, and a stepped portion 113 which defines an accommodation groove H may be formed in the bearing pocket portion 110.

As the stepped portion 113 protrudes upward along a circumference of the shaft hole 112, the accommodation groove H is formed between the stepped portion 113 and an inner wall 110a of the bearing pocket portion 110. The stepped portion 113 has an entirely protrusive annular partition structure.

Since the accommodation groove H is concavely formed between the inner wall 110a of the bearing pocket portion 110 and the stepped portion 113, the accommodation groove H traps foreign materials discharged from a motor housing, a wave washer, a bearing, and the like, and thus the foreign materials may be prevented from exiting through the shaft hole 112, A height of the stepped portion 113 may be appropriately changed in consideration of a size of the bearing 500 and whether a wave washer W is installed.

Meanwhile, although a bottom surface 111 of the bearing pocket portion 110 forming the accommodation groove H is illustrated in a flat shape, the present invention is not limited thereto, and the bottom surface 111 may be changed to be concave to extend a volume of the accommodation groove H.

A Motor Housing According to a Second Embodiment

Figure 5:
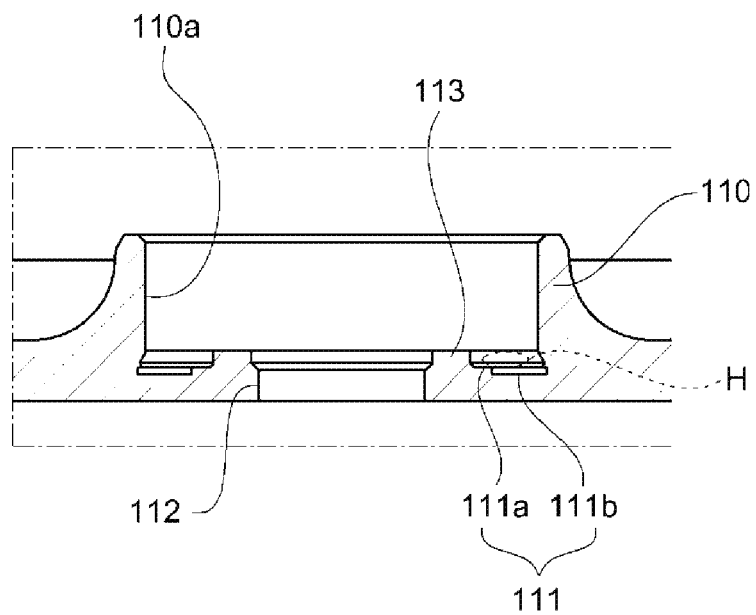
FIG. 5 is a view illustrating a bearing pocket portion of a housing of a motor according to a second exemplary embodiment of the present invention.
Figure 6:
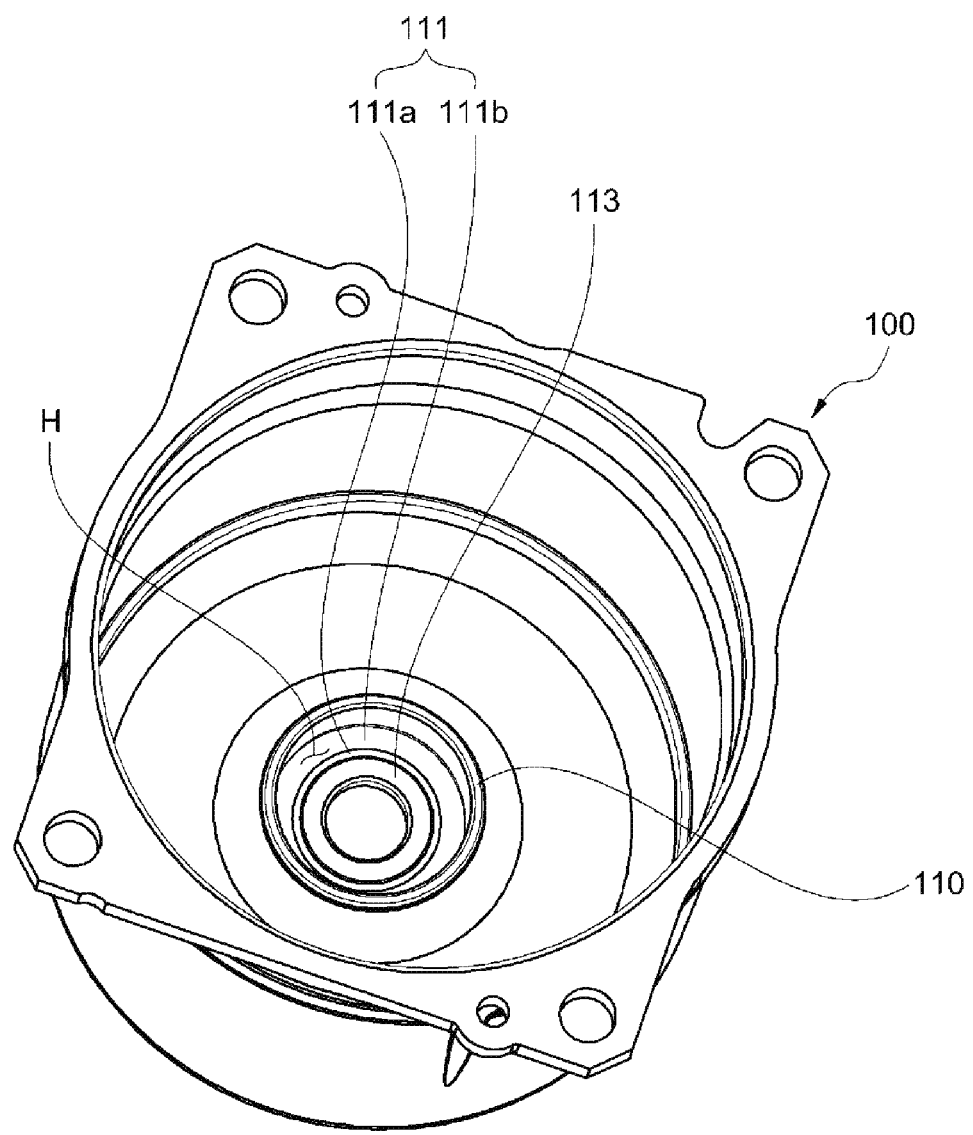
FIG. 6 is a view illustrating an accommodation groove of the housing illustrated in FIG. 5.

FIG. 5 is a view illustrating a bearing pocket portion of a housing of a motor according to a second exemplary embodiment of the present invention, and FIG. 6 is a view illustrating an accommodation groove of the housing illustrated in FIG. 5. FIGS. 5 and 6 are the views clearly illustrating main features for a clear conceptual understanding of the present invention, and thus various modifications are expected and the scope of the present invention is not limited to specific shapes illustrated in the drawings.

Referring to FIGS. 5 and 6, an accommodation groove H defined by a stepped portion 113 may be formed in a double step structure. Specifically, a bottom surface 111 of a bearing pocket portion 110 may be formed with two stepped surfaces 111a and 111b in a radial direction of a housing 100. The two stepped surfaces 111a and 111b may be formed as annular stepped surfaces which are gradually lowered in the radial direction.

Here, a wave washer W may be installed on the stepped surface 111a which is adjacent to the shaft hole 112 and refers to an inner stepped surface among two stepped surfaces 111a and 111b. The stepped surface 111a may be formed in a flat shape such that the wave washer W is stably seated thereon.

An accommodation groove H is defined by the stepped surface 111b which is located at an outside of the stepped surface 111a and refers to an outer stepped surface.

A seating space of the wave washer W is secured by the stepped portion 113, and the accommodation groove H is also defined by the stepped portion 113.

A motor housing according to a third embodiment.

Figure 7:
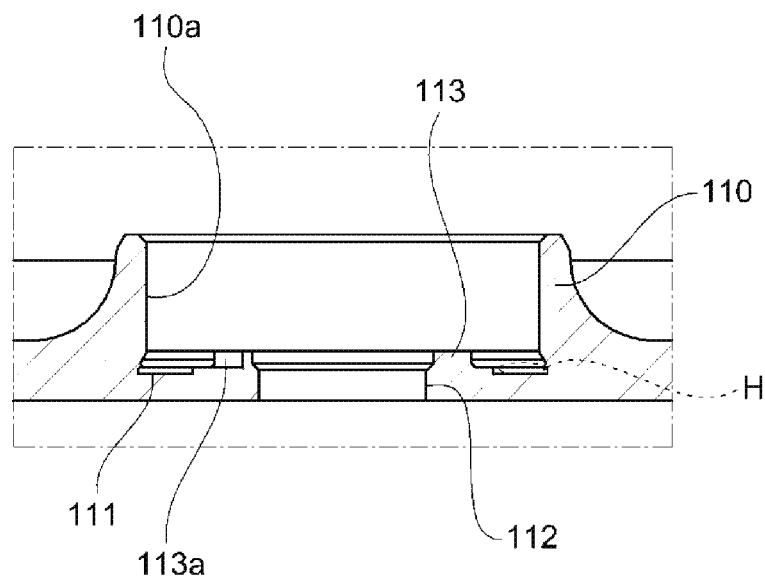
FIG. 7 is a view illustrating a bearing pocket portion of a housing of the motor according to a third exemplary embodiment of the present invention.
Figure 8:
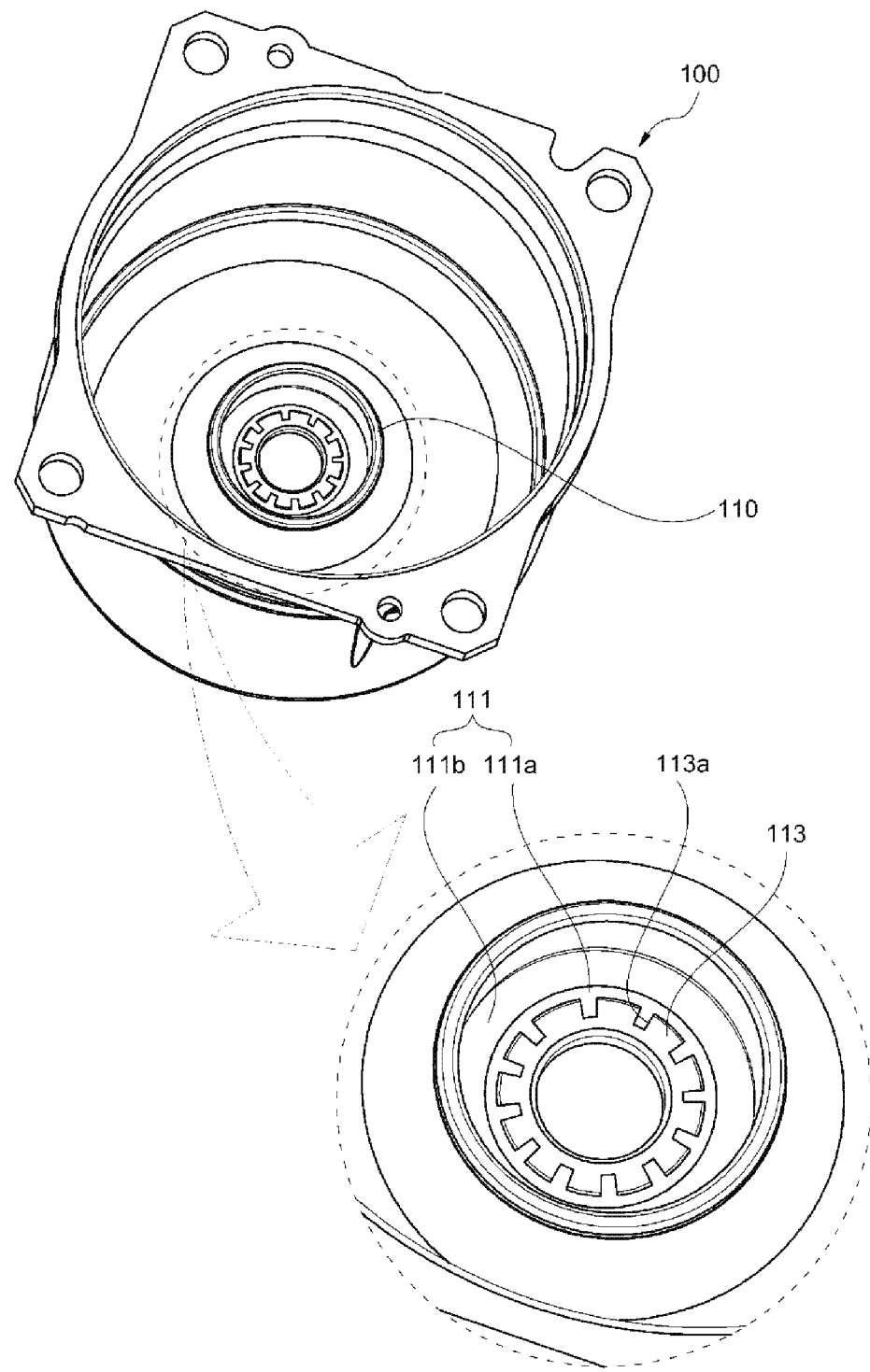
FIG. 8 is a view illustrating the accommodation groove of the housing illustrated in FIG. 7.

FIG. 7 is a view illustrating a bearing pocket portion of a housing of the motor according to a third exemplary embodiment of the present invention, and FIG. 8 is a view illustrating the accommodation groove of the housing illustrated in FIG. 7. FIGS. 7 and 8 are the views clearly illustrating main features for a clear conceptual understanding of the present invention, and thus various modifications are expected and the scope of the present invention is not limited to specific shapes illustrated in the drawings.

Referring to FIGS. 7 to 8, an accommodation groove H defined by a stepped portion 113 may be formed in a double step structure, and grooves 113a may be formed in the stepped portion 113 to be spaced a predetermined distance from each other in a circumferential direction. Each of the grooves 113a may be concavely formed up to an inner stepped surface 111a.

For example, the stepped portion 113 may be substantially formed in a saw tooth shape. Since the groove 113a traps foreign materials which pass the stepped portion 113 and exit through shaft hole 112, the foreign materials may be effectively prevented from exiting.

Figure 9:
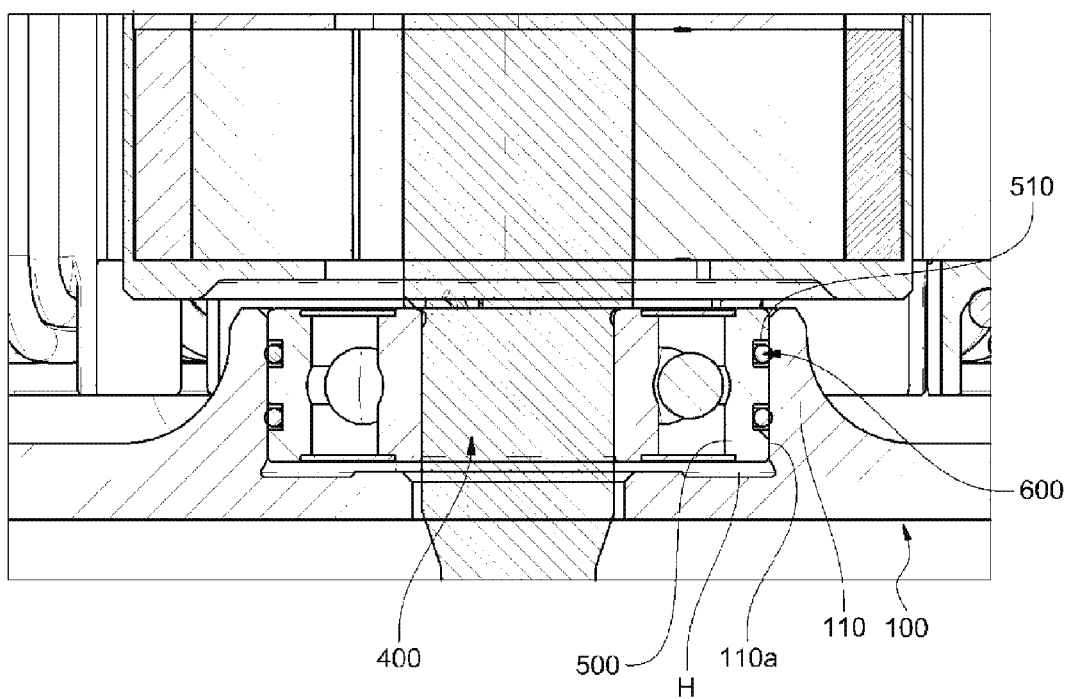
FIG. 9 is a view illustrating a sealing member and a sealing groove of a bearing.

FIG. 9 is a view illustrating a sealing member and a sealing groove of a bearing.

Referring to FIG. 9, a bearing 500 is inserted into a bearing pocket portion 110, and a sealing member 600 may be installed between an inner wall 110a of the bearing pocket portion 110 and an outer race of the bearing 500. The sealing member 600 prevents foreign materials accommodated in the accommodation groove H from exiting through a gap between the inner wall 110a of the bearing pocket portion 110 and the bearing 500 to effectively prevent the foreign materials exiting through the shaft hole.

Meanwhile, a sealing groove 510 which is concavely formed along a circumference of a side of the outer race of the bearing 500 and into which the sealing member 600 is inserted may be formed.

The housing of the motor and the motor including the same according to the exemplary embodiment of the present invention have been specifically described above with reference to the accompanying drawings.

While the present invention has been particularly described with reference to the exemplary embodiments, those skilled in the art should understand that various changes in form and details may be made without departing from the spirit and scope of the present invention. Therefore, the exemplary embodiments should be considered in a descriptive sense only and not for purposes of limitation. The scope of the present invention is defined not by the detailed description of the present invention but by the appended claims, and encompasses all modifications and equivalents that fall within the scope of the appended claims.

| Reference Numerals | |
| --- | --- |
| H: ACCOMMODATION GROOVE | 100: HOUSING |
| 110: BEARING POCKET PORTION | 110a: INNER WALL |
| 111a, 111b: STEPPED SURFACE | 111: BOTTOM SURFACE |
| 112: SHAFT HOLE | 113: STEPPED PORTION |
| 113a: GROOVE | 200: STATOR |
| 300: ROTOR | 400: SHAFT |
| 500: BEARING | 510: SEALING GROOVE |
| 600: SEALING MEMBER | |

The invention claimed is:

1. A housing of a motor comprising,
a bearing pocket portion that includes an accommodation space for a bearing, and a shaft hole; and
a bearing disposed in the accommodation space of the bearing pocket portion;
wherein the accommodation space for the bearing is formed by an inner wall of the bearing pocket portion,
wherein the shaft hole is formed in a bottom surface of the bearing pocket portion,
wherein a shaft is inserted into the shaft hole,
wherein the bearing pocket portion includes a stepped portion that protrudes upward along a circumference of the shaft hole and an accommodation groove that is formed between the stepped portion and the inner wall of the bearing pocket portion,
wherein the bottom surface of the bearing pocket portion forming the accommodation groove is formed with at least two stepped surfaces in a radial direction,
wherein the stepped surfaces include an inner stepped surface closest to the shaft hole, and
wherein the inner stepped surface is formed in a flat shape to be in contact with a wave washer.

2. The housing of a motor of claim 1, wherein the stepped surfaces include an outer stepped surface disposed outward of the inner stepped surface,
wherein the outer stepped surface forms the accommodation groove.

3. The housing of a motor of claim 2, wherein the stepped surfaces are formed in annular shapes and gradually lowered in the radial direction.

4. The housing of a motor of claim 3, wherein the outer stepped surface is concavely formed downward in a bottom surface of the inner stepped surface.

5. The housing of a motor of claim 1, wherein the stepped portion includes grooves concavely formed in a circumferential direction to be spaced a predetermined distance from each other such that a depth of each of the grooves is equal to a height of the stepped surface.

6. The housing of a motor of claim 5, wherein the inner stepped surface has a saw tooth shape.

7. A motor comprising:
a housing;
a stator coupled to the housing;
a rotor disposed inside the stator;
a shaft coupled to the rotor; and
wherein the housing protrudes upward from a lower surface thereof,
wherein the housing comprises:
a bearing pocket portion that includes an accommodation space for a bearing, and a shaft hole; and
a bearing disposed in the accommodation space of the bearing pocket portion,
wherein the accommodation space for the bearing is formed by an inner wall of the bearing pocket portion,
wherein the shaft hole is formed in a bottom surface of the bearing pocket portion,
wherein the shaft is disposed in the shaft hole,
wherein the bearing pocket portion includes a stepped portion which protrudes upward along a circumference of the shaft hole and an accommodation groove that is formed between the stepped portion and the inner wall of the bearing pocket portion,
wherein the bottom surface of the bearing pocket portion forming the accommodation groove is formed with at least two stepped surfaces in a radial direction,
wherein the stepped surfaces include an inner stepped surface closest to the shaft hole, and
wherein the inner stepped surface is formed in a flat shape to be in contact with a wave washer.

8. The motor of claim 7, wherein the stepped surfaces include an outer stepped surface disposed outward of the inner stepped surface,
wherein the outer stepped surface forms the accommodation groove.

9. The motor of claim 8, wherein the stepped surfaces are formed in annular shapes and gradually lowered in the radial direction.

10. The motor of claim 9, wherein the outer stepped surface is concavely formed downward in a bottom surface of the inner stepped surface.

11. The motor of claim 7, wherein the stepped portion includes grooves concavely formed in a circumferential direction to be spaced a predetermined distance from each other such that a depth of each of the grooves is equal to a height of the stepped surface.

12. The motor of claim 11, wherein the inner stepped surface has a saw tooth shape.

13. The motor of claim 7, further comprising:
a sealing member disposed between an inner wall of the bearing pocket portion and the bearing.

14. The motor of claim 13, wherein the bearing includes a sealing groove which is concavely formed in a circumference of a side of an outer race and into which the sealing member is inserted.

* * * * *